United States Patent
Kain et al.

(10) Patent No.: US 10,817,353 B1
(45) Date of Patent: Oct. 27, 2020

(54) ADAPTABLE DYNAMIC REGION FOR HARDWARE ACCELERATION

(71) Applicant: Xilinx, Inc., San Jose, CA (US)

(72) Inventors: Julian M. Kain, Longmont, CO (US); Adam P. Donlin, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1 day.

(21) Appl. No.: 16/225,279

(22) Filed: Dec. 19, 2018

(51) Int. Cl.
  *G06F 30/34* (2020.01)
  *G06F 9/54* (2006.01)
  *G06F 9/38* (2018.01)
  *G06F 30/39* (2020.01)

(52) U.S. Cl.
  CPC ............ *G06F 9/545* (2013.01); *G06F 9/3867* (2013.01); *G06F 9/3877* (2013.01); *G06F 30/34* (2020.01); *G06F 30/39* (2020.01)

(58) Field of Classification Search
  USPC .......................................................... 716/116
  See application file for complete search history.

(56) References Cited

U.S. PATENT DOCUMENTS 9,515,658 B1 * 12/2016 Chen ................ H03K 19/17756

OTHER PUBLICATIONS

Xilinx, inc., SDAccel Platform Reference Design User Guide, Kintex UltraScale KCU1500 Acceleration Development Board, UG1234, v2017.1, Jun. 20, 2017, pp. 1-51, San Jose, CA USA.

* cited by examiner

*Primary Examiner* — Eric D Lee
(74) *Attorney, Agent, or Firm* — Kevin T. Cuenot

(57) ABSTRACT

Creating an adaptable dynamic region for hardware acceleration can include receiving a first kernel for inclusion in a circuit design for an integrated circuit of an accelerator platform. The circuit design includes a dynamic design corresponding to a dynamic region of programmable circuitry in the integrated circuit that couples to a static region of the programmable circuitry. The first kernel can be included in the within the dynamic design. A global resource used by the first kernel can be determined. An interconnect architecture for the dynamic design can be constructed based on the global resource used by the first kernel.

20 Claims, 11 Drawing Sheets

1100

Receive a kernel for inclusion in a circuit design for an integrated circuit of an accelerator platform
1102

Include kernel in the dynamic design
1104

Determine a global resource used by the kernel
1106

Construct an interconnect architecture for the dynamic design based on the global resource used by the kernel
1108

Implement the dynamic design
1110

1100

Receive a kernel for inclusion in a circuit design for an integrated circuit of an accelerator platform
1102

Include kernel in the dynamic design
1104

Determine a global resource used by the kernel
1106

Construct an interconnect architecture for the dynamic design based on the global resource used by the kernel
1108

Implement the dynamic design
1110

FIG. 11

ADAPTABLE DYNAMIC REGION FOR HARDWARE ACCELERATION

TECHNICAL FIELD

This disclosure relates to integrated circuits (ICs) and, more particularly, to adaptable dynamic regions within programmable ICs for hardware acceleration.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs may also be implemented in other ways, e.g., using fuse or antifuse technology. The phrase "programmable IC" may include, but is not limited to, these devices and further may encompass devices that are only partially programmable. For example, one type of programmable IC includes a combination of hard-coded transistor logic and a programmable switch fabric that programmably interconnects the hard-coded transistor logic.

SUMMARY

In one aspect, a method includes receiving, using computer hardware, a first kernel for inclusion in a circuit design for an integrated circuit (IC) of an accelerator platform. The circuit design includes a dynamic design corresponding to a dynamic region of programmable circuitry in the IC that couples to a static region of the programmable circuitry. The method includes including, using the computer hardware, the first kernel within the dynamic design, determining, using the computer hardware, a global resource of the accelerator platform used by the first kernel, and constructing, using the computer hardware, an interconnect architecture for the dynamic design based on the global resource used by the first kernel.

In another aspect, a system includes a processor configured to initiate operations. The operations include receiving a first kernel for inclusion in a circuit design for an IC of an accelerator platform. The circuit design includes a dynamic design corresponding to a dynamic region of programmable circuitry in the IC that couples to a static region of the programmable circuitry. The operations include including the first kernel within the dynamic design, determining a global resource of the accelerator platform used by the first kernel, and constructing an interconnect architecture for the dynamic design based on the global resource used by the first kernel.

In another aspect, a computer program product includes a computer readable storage medium having program code stored thereon. The program code is executable by a processor to perform operations. The operations include receiving a first kernel for inclusion in a circuit design for an IC of an accelerator platform. The circuit design includes a dynamic design corresponding to a dynamic region of programmable circuitry in the IC that couples to a static region of the programmable circuitry. The operations include including the first kernel within the dynamic design, determining a global resource of the accelerator platform used by the first kernel, and constructing an interconnect architecture for the dynamic design based on the global resource used by the first kernel.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 11 illustrates an example method of creating an adaptive dynamic region within an IC.

DETAILED DESCRIPTION

Figure 1:
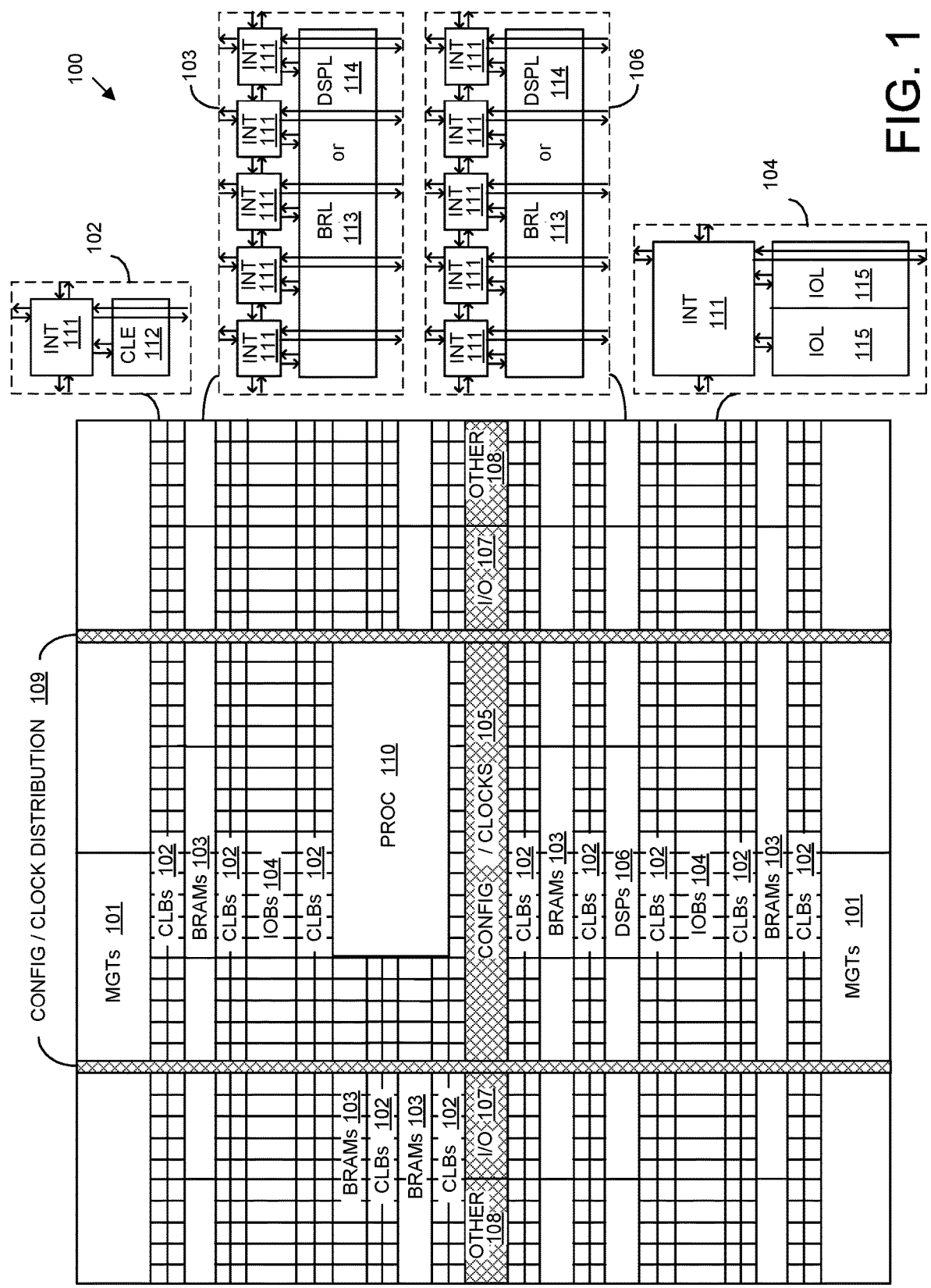
FIG. 1 illustrates an example architecture for an integrated circuit (IC).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to adaptable dynamic regions within programmable ICs for hardware acceleration. Partial reconfiguration is a process where a sub-region of programmable circuitry within an IC referred to as a "partial reconfiguration region" or "PR region" may be dynamically reconfigured by loading a partial configuration bitstream into the programmable IC. Within this disclosure, a PR region is also referred to as a "dynamic region". The partial configuration bitstream may specify different circuitry than previously implemented in the dynamic region. The partial configuration bitstream does not specify new and/or different circuitry for portions of the programmable circuitry outside of the dynamic region. The dynamic region may undergo modification through partial reconfiguration, e.g., the loading of a partial configuration bitstream for the dynamic region, repeatedly where different partial configuration bitstreams specify different circuitry, while the other regions of the programmable circuitry of the programmable IC, referred to as "static circuitry" or "static regions", continue to operate without interruption.

Partial reconfiguration is often used for purposes of hardware acceleration. Hardware acceleration refers to implementing the functionality of program code, often referred to as a kernel, in hardware or circuitry. The kernel may represent a user design, function, or application. The hardware implementation of the kernel is functionally equivalent to the program code version of the kernel. Rather than execute compiled program code of the kernel using some sort of processor, the kernel is implemented as circuitry configured to perform the task. A hardware accelerated kernel usually provides improved performance, whether faster execution, reduced power, etc., compared to executing the kernel using some sort of processor.

In the context of partial reconfiguration and hardware acceleration, the kernels are akin to user provided functions and are implemented in the dynamic region of programmable circuitry of the IC. In general, the static region provides the hardware infrastructure necessary for the kernel to operate and to communicate with systems external to the programmable IC. For example, the static circuitry provides hardware resources, e.g., interfaces, that allow the kernels to communicate with other systems or components such as a host system, the circuit board to which the programable IC is coupled, and/or other devices such as memory on the circuit board. In this regard, the static region, though implemented in programmable circuitry, is fixed and independent of the dynamic region in which the kernels are implemented.

In the usual case, the kernel is incorporated into a dynamic design that includes default infrastructure circuitry. The dynamic design, for example, may include default infrastructure circuitry that supports integration of the kernel with the static circuitry and provides the kernel with direct access to other resources such as memory. As an example, the dynamic design may include an interconnect infrastructure that includes a plurality of memory controllers for accessing off-chip random-access memories (RAMs). Though part of the dynamic design, this default infrastructure circuitry is inflexible and is ultimately physically implemented in the dynamic region of the IC whether the kernel uses the entirety of the default infrastructure circuitry or only a small portion thereof. This type of solution effectively utilizes a maximum amount of IC resources that must be synthesized, placed, routed, physically implemented in the IC, and powered in the IC regardless of use by the kernel. Thus, programmable circuitry resources allocated to the default infrastructure circuitry of the dynamic design that are not used by the kernel(s) in the dynamic design are effectively wasted since such resources are unavailable for use in implementing a kernel or other kernels.

In accordance with the inventive arrangements described within this disclosure, the dynamic region within the IC is automatically implemented based on the actual requirements of the kernel(s) to be implemented therein. The dynamic design, for example, is dynamically constructed based on the kernels to be included, the needs of the kernels included therein, the capabilities of the acceleration platform, any user provided instructions and/or directives, and any other cores the user may choose to include. As a result, the infrastructure circuitry that is physically implemented in the dynamic region is what is required by the kernel(s) without including other circuitry as a matter of course that would go unused. A system is capable of automatically implementing the dynamic region using a data-driven design flow that is capable of instantiating and connecting only those circuit resources that are required by the kernel(s).

In another aspect, in the case where the IC includes a plurality of dies (e.g., is a multi-die IC), the dynamic design may be implemented to optimize the timing properties of signals that pass between different dies of the multi-die IC. Signals that cross from one die to another in a multi-die IC are referred to herein as "inter-die signals". Within the multi-die IC, the dynamic region may span across a plurality of different dies. Kernels may be distributed across these dies of the multi-die IC in the dynamic region and communicate with one another. The inventive arrangements described herein are capable of optimizing timing properties of inter-die signals by automatically inserting circuit structures to improve timing of such signals. The circuit structures may be automatically inserted and configured based on use of the inter-die signals and the inserted circuit structures by kernels to pass signals between different dies of the multi-die IC.

In another aspect, the inventive arrangements described herein are capable of optimizing inter-die signals exchanged between kernels implemented across the dies to utilize fewer physical resources of the IC such as inter-die wires. The multi-die IC includes a limited number of inter-die wires. The number of inter-die signals may exceed the physical inter-die wires that are available. This optimization reduces the number of inter-die wires needed to implement the inter-die signals and facilitates timing closure, thereby allowing a system to implement the dynamic design in less time than would otherwise be the case while also abstracting lower level details of the design flow away from users with more software-development centric experience.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example architecture 100 for an IC. In one aspect, architecture 100 may be implemented within a programmable IC. For example, architecture 100 may be used to implement a field programmable gate array (FPGA). Architecture 100 may also be representative of a System-on-Chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 100 includes several different types of programmable circuit, e.g., logic, blocks. For example, architecture 100 may include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized I/O blocks 107 (e.g., configuration ports and clock ports), and other programmable logic 108 such as digital clock managers, analog-to-digital converters, system monitoring logic, and so forth. The term "BRAM" may include any of a variety of block RAMs including "Ultra-RAM" circuit blocks.

In some ICs, each programmable tile includes a programmable interconnect element (INT) 111 having standardized connections to and from a corresponding INT 111 in each adjacent tile. Therefore, INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 may include a configurable logic element (CLE) 112 that may be programmed to implement user logic plus a single INT 111. A BRAM 103 may include a BRAM logic element (BRL) 113 in addition to one or more INTs 111. Typically, the number of INTs 111 included in a tile depends on the height of the tile. As pictured, a BRAM tile has the same height as five CLBs, but other numbers (e.g., four) also may be used. A DSP tile 106 may include a DSP logic element (DSPL) 114 in addition to an appropriate number of INTs 111. An IOB 104 may include, for example, two instances of an I/O logic element (IOL) 115 in addition to one instance of an INT 111. The actual I/O pads connected to IOL 115 may not be confined to the area of IOL 115.

In the example pictured in FIG. 1, a columnar area near the center of the die, e.g., formed of regions 105, 107, and 108, may be used for configuration, clock, and other control logic. Horizontal areas 109 extending from this column may be used to distribute the clocks and configuration signals across the breadth of the programmable IC.

Some ICs utilizing the architecture illustrated in FIG. 1 include additional logic blocks that disrupt the regular columnar structure making up a large part of the IC. The additional logic blocks may be programmable blocks and/or dedicated circuitry. For example, a processor block depicted as PROC 110 spans several columns of CLBs and BRAMs.

In one aspect, PROC 110 may be implemented as dedicated circuitry, e.g., as a hardwired processor, that is fabricated as part of the die that implements the programmable circuitry of the IC. PROC 110 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 may be omitted from architecture 100 and replaced with one or more of the other varieties of the programmable blocks described. Further, such blocks may be utilized to form a "soft processor" in that the various blocks of programmable circuitry may be used to form a processor that can execute program code as is the case with PROC 110.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 1 that are external to PROC 110 such as CLBs 102 and BRAMs 103 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 110 or a soft processor. In some cases, architecture 100 includes a dedicated configuration processor that loads the configuration bitstream to the appropriate configuration memory and/or processor memory. The dedicated configuration processor does not execute user-specified program code. In other cases, architecture 100 may utilize PROC 110 to receive the configuration bitstream, load the configuration bitstream into appropriate configuration memory, and/or extract program code for execution.

FIG. 1 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 1 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 110 within the IC are for purposes of illustration only and are not intended as limitations.

Figure 2:
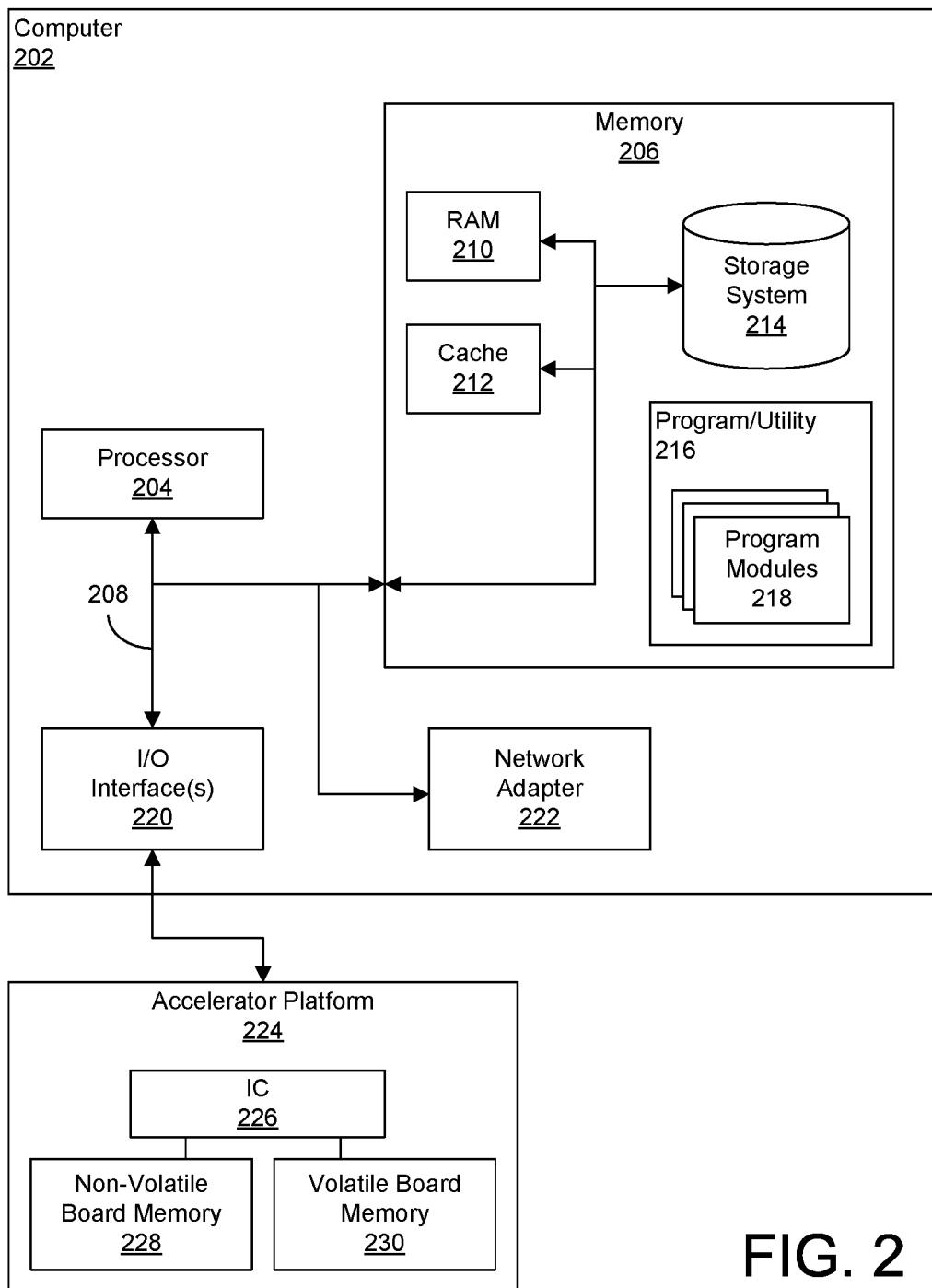
FIG. 2 illustrates an example of a system including an accelerator platform.

FIG. 2 illustrates an example of a system 200 including an accelerator platform 224. System 200 is an example implementation of a computing node that can be used in a standalone capacity, as part of a computing cluster, or as a cloud computing node. The example of FIG. 2 is not intended to suggest any limitation as to the scope of use or functionality of the embodiments described herein. System 200 is an example of computer hardware that is capable of performing the various operations described within this disclosure. System 200, for example, is capable of performing a design flow involving hardware compilation (e.g., synthesis, placement, routing, and/or bitstream generation) to implement circuit designs within an IC included in accelerator platform 224.

System 200 includes a computer 202, which is operational with numerous other general purpose or special purpose computing system environments or configurations. Examples of computing systems, environments, and/or configurations that may be suitable for use with computer 202 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer 202 can be described in the general context of computer system-executable instructions, such as program modules, being executed by a computer system. Generally, program modules can include routines, programs, objects, components, logic, data structures, and so on that perform particular tasks or implement particular abstract data types. Computer 202 can be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer 202 is shown in the form of a general-purpose computing device. The components of computer 202 can include, but are not limited to, one or more processors 204, a memory 206, and a bus 208 that couples various system components including memory 206 to processor 204. In an example implementation, computer 202 is a host system that is capable of offloading tasks to be performed by accelerator platform 224.

Bus 208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer 202 typically includes a variety of computer system readable media. Such media may be any available media that is accessible by computer 202 and can include both volatile and non-volatile media, removable and non-removable media.

Memory 206 can include computer system readable media in the form of volatile memory, such as RAM 210 and/or cache memory 212. Computer 202 can also include other removable/non-removable, volatile/non-volatile computer system storage media. By way of example, storage system 214 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 208 by one or more data media interfaces. As will be further depicted and described below, memory 206 can include at least one program product having a set (e.g., at least one) of program modules that are configured to carry out the functions of embodiments of the invention.

Program/utility 216, having a set (at least one) of program modules 218, may be stored in memory 206 by way of example, and not limitation, as well as an operating system, one or more application programs, other program modules, and program data. Program modules 218 generally carry out the functions and/or methodologies of embodiments of the invention as described herein.

For example, one or more of program modules 218 can perform the various operations described within this disclosure including, but not limited to, implementing a circuit design within a target IC. For example, one or more of program modules 218 may implement an application that is capable of offloading tasks to accelerator platform 224 during runtime of system 200. One or more of program modules 218 may also implement an Electronic Design Automation (EDA) application that is capable of performing one or more of the operations described herein relating to implementing a circuit design or any portion thereof.

Program/utility 216 is executable by processor 204. Program/utility 216 and any data items used, generated, and/or operated upon by computer 202 are functional data structures that impart functionality when employed by computer 202. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 202 may also communicate with one or more other devices. Examples of such other devices can include a keyboard, a pointing device, a display or other devices that enable a user to interact with computer 202. Other examples of devices may include any devices (e.g., network card, modem, etc.) that enable computer 202 to communicate with one or more other computing devices.

In the example of FIG. 2, computer 202 is coupled to an accelerator platform 224. Communication with devices such as accelerator platform 224 may occur via Input/Output (I/O) interfaces 220. In an example implementation, accelerator platform 224 is coupled to computer 202 via a communications bus such as PCIe. Still yet, computer 202 can communicate with one or more networks such as a local area network (LAN), a general wide area network (WAN), and/or a public network (e.g., the Internet) via network adapter 222. As depicted, network adapter 222 communicates with the other components of computer 202 via bus 208. It should be understood that although not shown, other hardware and/or software components could be used in conjunction with computer 202. Examples, include, but are not limited to: microcode, device drivers, redundant processing units, external disk drive arrays, RAID systems, tape drives, and data archival storage systems, etc.

Accelerator platform 224 may be implemented as a circuit board, e.g., a card, that couples to computer 202. Accelerator platform 224 may include an IC 226, referred to herein from time-to-time as a "target IC", non-volatile platform memory 228, and volatile platform memory 230. An example of non-volatile platform memory 228 is flash memory. An example of volatile platform memory 230 is RAM.

While computer 202 is capable of operating as a host system in the context of hardware acceleration to offload tasks at runtime of system 200, in another example, computer 202 is capable of implementing an EDA system. For example, computer 202 is capable of operating as an EDA system to perform a design flow that implements one or more kernels for use within IC 226 of accelerator platform 224 and/or operate as a host system controlling physical implementation of the kernels in IC 226, e.g., via partial reconfiguration of IC 226, over time for purposes of hardware acceleration.

Figure 3:
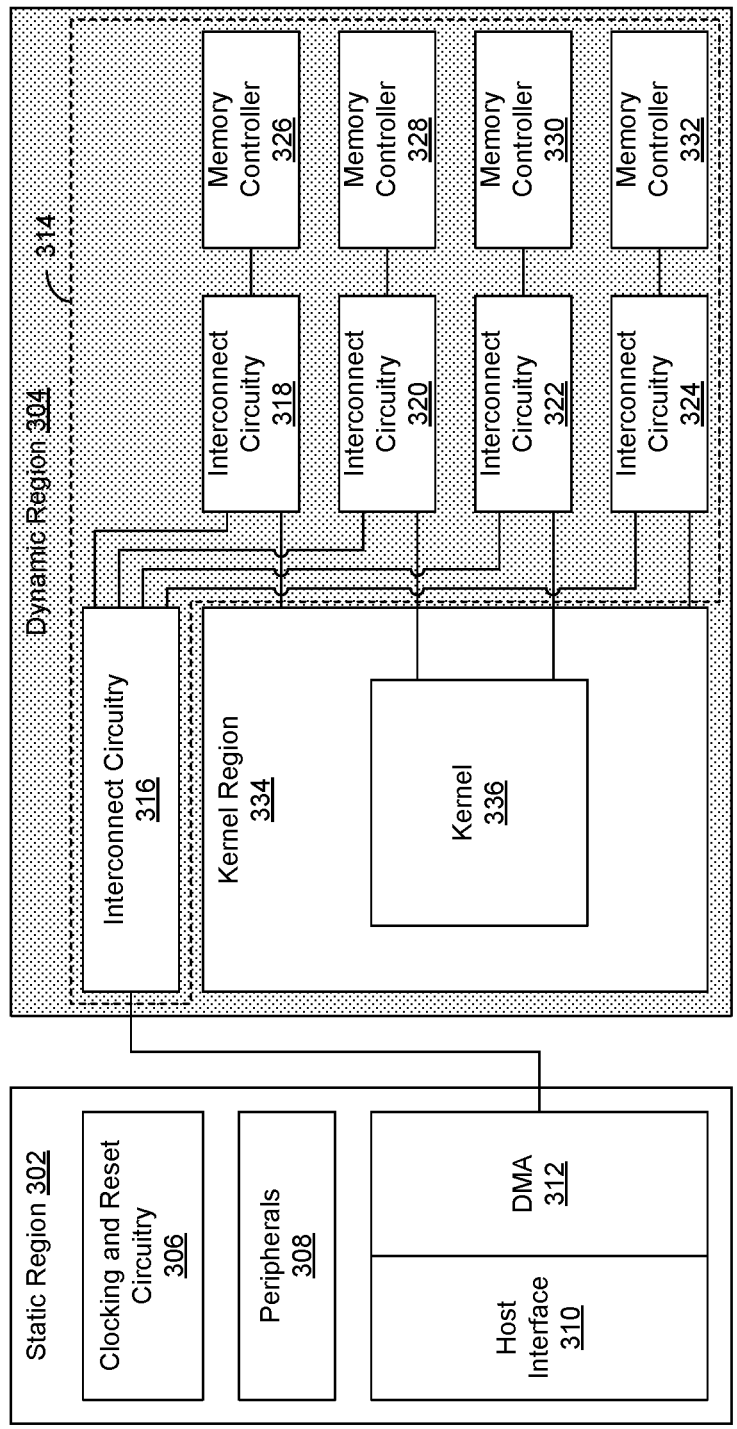
FIG. 3 illustrates an example of a static region and a dynamic region including default infrastructure circuitry within an IC.

FIG. 3 illustrates an example of a static region 302 and a dynamic region 304 including default infrastructure circuitry 314 within an IC. In the example of FIG. 3, dynamic region 304 is implemented using conventional techniques that include the infrastructure circuitry therein in whole regardless of whether the user's kernel utilizes all or part of such circuitry. The IC may be implemented as described in connection with FIGS. 1 and 2.

Typically, the static region 302 is specified by a static design. Dynamic region 304 is specified, at least in part, by a dynamic design. In some cases, a user may be provided with a circuit design that includes both the static design and the dynamic design. The user may specify one or more kernels that are to be included within the dynamic design for implementation in the dynamic region of the IC. In other cases, the user may be provided with only the dynamic design and include one or more kernels therein. In any case, the dynamic design, once populated with the user's kernel (s), may undergo a design flow to implement the dynamic design in the dynamic region of the IC to couple to, and complement, the static region. The system may not require the full static design in order to implement the dynamic design. The dynamic design or both the static design and the dynamic design (into which one or more kernels are included) may be provided to the user by the accelerator platform provider so that the user may develop kernels without needing specific knowledge of the accelerator platform and/or the programmable IC of the accelerator platform.

In the example of FIG. 3, static region 302 includes clocking and reset circuitry 306, one or more peripherals 308, a host interface 310, and a direct memory access circuit (DMA) 312. Clocking and reset circuitry 306 is capable of coupling to kernels implemented in dynamic region 304 to provide clock signaling and reset signaling thereto. Clocking and reset circuitry 306 may be controlled by a host system as described herein (e.g., computer system 202 of FIG. 2). Host interface 310 is capable of communicating with the host system. In an example implementation, host interface 310 is implemented as a PCIe endpoint. Host interface 310 may be coupled to DMA 312. DMA 312 is coupled to the default infrastructure circuitry 314 in dynamic region 304.

Dynamic region 304 includes default infrastructure circuitry 314. As illustrated, default infrastructure circuitry 314 implements an interconnect architecture that includes interconnect circuit blocks 316, 318, 320, 322, and 324, and memory controllers 326, 328, 330, and 332. In general, each of memory controllers 326-332 is capable of accessing a particular memory bank. Infrastructure circuitry 314 provides support for connecting to a wide array of RAM (not shown) on the platform accelerator via memory controllers 326-332 and interconnects 316-324. In the example of FIG. 3, dynamic region 304 includes a kernel region 334 in which user kernels may be implemented. As pictured, kernel 336 is implemented in kernel region 334.

In the example of FIG. 3, though dynamic region 304 supports dynamic partial reconfiguration to implement different kernels and/or combinations of kernels therein over time, the actual portion of programmable circuitry that is available and used for implementing kernels is reduced by the amount of programmable circuitry needed to implement default infrastructure circuitry 314. In the example of FIG. 3, kernel 336 only utilizes two of the memory controllers, e.g., memory controller 328 and 330. The remaining portions of default infrastructure circuitry 314 within dynamic region 304 are unused. The unused portions of default infrastructure circuitry 314 such as interconnect circuitry 318, memory controller 326, interconnect circuitry 324, and memory controller 332 are still synthesized, placed, and routed. This requires significant runtime during implementation. Further, once physically implemented (e.g., at runtime), the unused portions of default infrastructure circuitry 314 consume programmable circuitry resources that may not be used by kernel 336. These unused portions of default infrastructure circuitry 314 also consume power.

Figure 4:
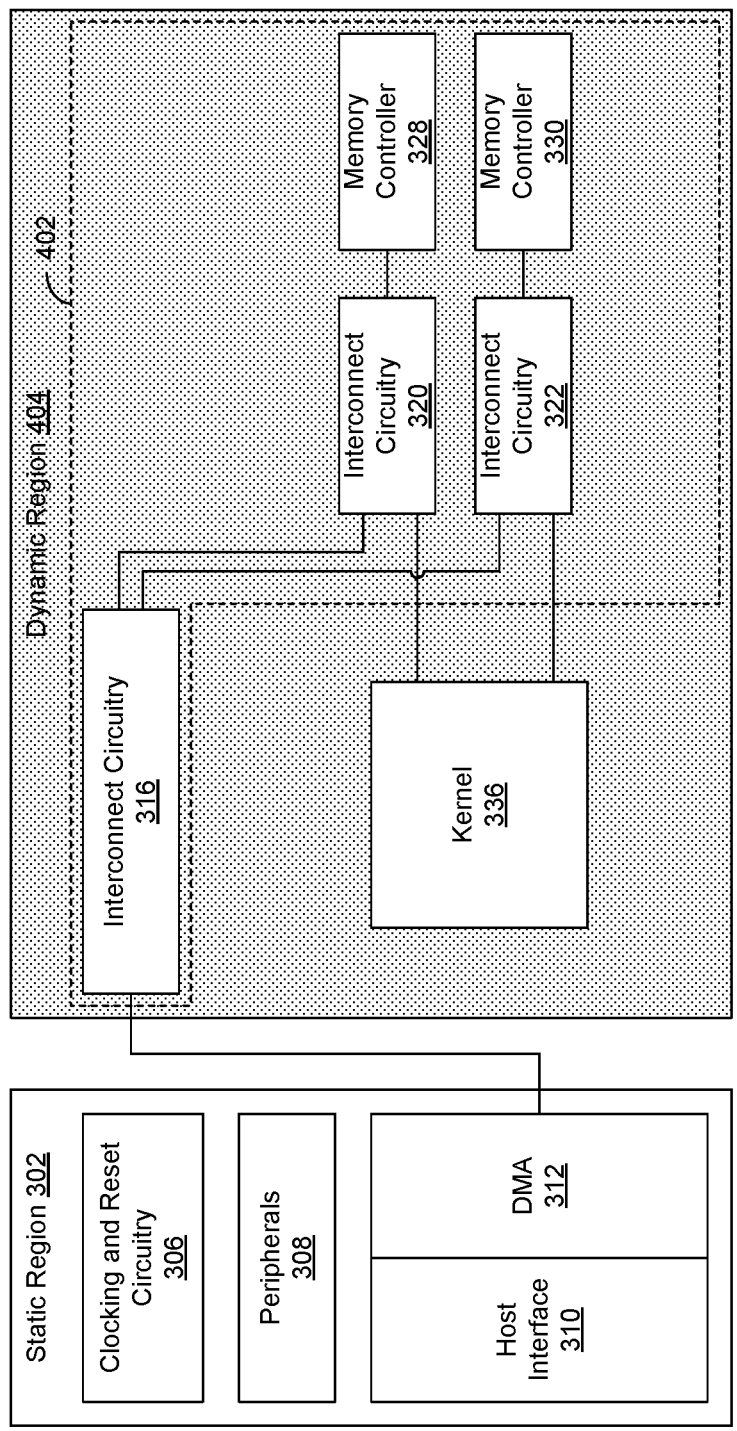
FIG. 4 illustrates an example of a static region and an adaptive dynamic region within an IC.

FIG. 4 illustrates an example of a static region and an adaptive dynamic region 404 within an IC. The IC may use an architecture as described in connection with FIG. 1. In the example of FIG. 4, dynamic region 404 is built dynamically without relying on any default infrastructure circuitry. Rather, the system is capable of analyzing the dynamic design and any user specified kernels to be included therein to determine the particular global resources of the accelerator platform that are utilized by the kernel(s). As defined within this disclosure, the term "global resource" means circuitry that may be accessed by a kernel implemented in the target IC of the accelerator platform when the target IC is properly configured.

In one aspect, "global resource" refers to circuitry implemented on the accelerator platform that is external to the target IC and that may be accessed by a kernel implemented in the target IC. In another aspect, "global resource" refers to a memory resource located on IC 226 of the accelerator platform such as a BRAM. For example, the BRAM may be located in the static region. In still another aspect, "global resource" refers to a remote memory such as a network accessible memory. The network accessible memory may include remote memories that are not provided or included by the host system.

Examples of global resources include, but are not limited to, volatile memory of the accelerator platform, nonvolatile memory of the accelerator platform, network interfaces and/or ports of the accelerator platform, peripherals of the accelerator platform, remote memories, processors that may be implemented on the accelerator platform, and remote processors. In the example of FIG. 4, only those portions of the infrastructure circuitry that are actually used by the kernel(s) to be included, e.g., instantiated, in the dynamic design and physically implemented in the IC are included.

In the example of FIG. 4, the dynamic design includes kernel 336, which utilizes only memory controllers 328 and 330. Accordingly, interconnect circuit blocks 316, 320, and 322 and memory controllers 328 and 330 are instantiated in the dynamic design. The system is capable of synthesizing, placing, and routing kernel 336 with the portions of the infrastructure circuitry 402 that are actually used. Due to the reduction in the amount of infrastructure circuitry that is needed, the system is capable of performing the design flow in less time than would otherwise be the case (e.g., the system is capable of performing the design flow with a faster runtime than would be the case in the example of FIG. 3). Further, once dynamic region 404 is physically implemented in the IC, dynamic region 404 consumes less power than would otherwise be the case (e.g., less power than in the example of FIG. 3).

Figure 5:
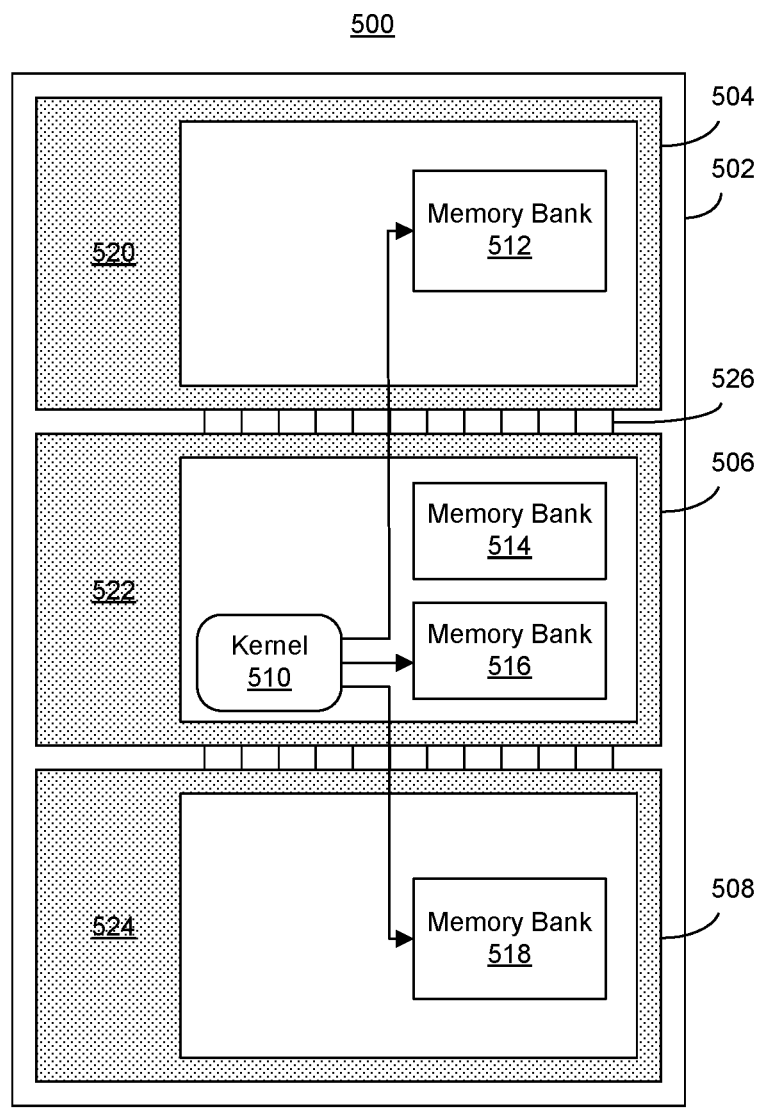
FIG. 5 illustrates an example of kernel placement within a multi-die IC.

FIG. 5 illustrates an example of kernel placement within a multi-die IC 500. Multi-die IC 500 includes a plurality of dies 504, 506, and 508 coupled to an interposer 502. Interposer 502 includes inter-die wires 526 that couple adjacent ones of dies 504, 506, and 508. It should be appreciated that any of a variety of different types of multi-die IC technologies may be used and that the particular example shown in FIG. 5 using an interposer is for purposes of illustration only. Further, the number of dies included in multi-die IC 500 is for purposes of illustration and not limitation. Multi-die IC 500 may include fewer or more dies than shown in FIG. 5.

In any case, each of dies 504, 506, and 508 includes programmable circuitry. In an example implementation, the dynamic region that may include kernels spans multiple dies. For example, the portion of the programmable circuitry in each of dies 504, 506, and 508 without shading may be considered part of the dynamic region. Each of dies 504, 506, and 508 also includes a static region 520, 522, and 524, respectively, shown with shading.

In an example implementation, a system is capable of automatically locating the kernels in dies during placement based on the particular global resources used by each respective kernel. In the example of FIG. 5, kernel 510 accesses memory banks 512, 516, and 518. Kernel 510 does not access memory bank 514. In this example, the system is capable of automatically placing kernel 510 in die 506 of multi-die IC 500 to reduce the number of inter-die wires 526 that are used and to minimize the distance (e.g., improve timing) between kernel 510 and the particular memory banks accessed by kernel 510. If, for example, the system were to place kernel 510 in die 504 or die 508, the distance between kernel 510 to the farthest memory bank would span two dies, which reduces the likelihood of the dynamic design meeting timing.

The example of FIG. 5 illustrates an example where the kernel is mapped to the address space of multiple global resources. In another example, kernel 510 may be mapped to a single global resource (e.g., a single memory bank) or to multiple global resources (e.g., multiple memory banks) located in a same die. In that case, the system is capable of automatically determining the particular global resources used by the kernel, determining the particular die in which such global resources are located, and assigning or locating the kernel to the same die that includes the global resources used by the kernel.

In another example, users are able to provide an explicit instruction as a compiler directive that indicates the particular die of the multi-die IC in which a kernel is to be implemented. In the example of FIG. 5, a user may provide a directive that specifies that kernel 510 is to be implemented in die 506. The directive may be provided as a command line directive, for example.

Figure 6:
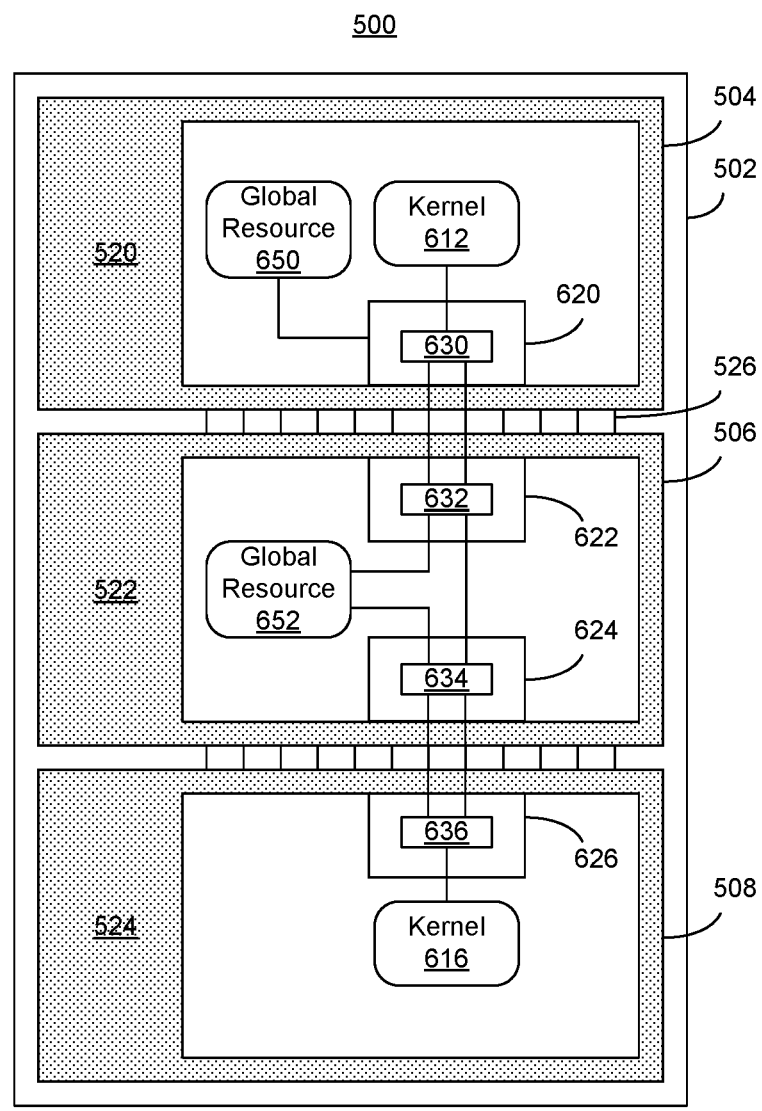
FIG. 6 illustrates an example of optimizing connections between kernels located in different dies of a multi-die IC.

FIG. 6 illustrates an example of optimizing connections between kernels located in different dies of a multi-die IC. In one aspect, the system is capable of packing, or combining, connections, e.g., inter-die signals, between kernels that are distributed or allocated to different dies. The system is also capable of automatically inserting circuitry in the dynamic region to improve timing of inter-die signals between kernels.

In the example of FIG. 6, kernel 612 is implemented in die 504; and, kernel 616 is implemented in die 508. Global resource 650 is implemented in die 504; and, global resource 652 is implemented in die 506. FIG. 6 illustrates that a single kernel may map onto more than one instance of a global resource. Further, any one of the global resources that is mapped to a particular kernel may also be shared with another kernel or kernels. In this regard, for purposes of illustration, each of kernels 612 and 616 is mapped to and capable of accessing global resource 652. Each of kernels 612 and 616 is mapped to and capable of accessing global resource 650.

As pictured, the system has automatically inserted interconnect circuitry in the dynamic region by including interconnect circuitry 620, 622, 624, and 626. Interconnect circuitry 620, 622, 624, and 626 couples to inter-die wires 526 to convey inter-die signals between kernels and global resources located in different dies than the kernel(s) to which the global resources are mapped. The system has customized interconnect circuitry 620-626 to include pipeline stages 630, 632, 634, and 636, respectively, to account for timing of the inter-die signals routed through the respective interconnects and between dies. The pipelining stages, or circuitry, may be implemented as one or more clocked flip-flops. As pictured, interconnect circuitry 620-626 and the pipelining stages 630, 632, 634, and 636 included therein, respectively, are inserted in the dynamic regions to straddle the inter-die wires (e.g., die boundaries) between two different and/or adjacent dies.

An example of interconnect circuitry is an on-chip interconnect such as the Advanced Microcontroller Bus Architecture (AMBA) eXtensible Interface (AXI) bus. An AMBA AXI bus is an embedded microcontroller bus interface for use in establishing on-chip connections between circuit blocks and/or systems. AXI is provided as an illustrative example of interconnect circuitry and is not intended as a limitation of the examples described within this disclosure. Other examples of interconnect circuitry include, but are not limited to, other types of buses, a network-on-chip (NoC), a cross-bar, or other type of switch.

In the example of FIG. 6, kernel 612 is capable of accessing global resource 650 via interconnect circuitry 620. Kernel 612 is capable of accessing global resource 652 via interconnect circuitry 620 and interconnect circuitry 622. Kernel 616 is capable of accessing global resource 652 via interconnect circuitry 626 and 624. Kernel 616 may also access global resource 650 via interconnect circuitries 626, 624, 622, and 620.

Using interconnect circuitry to establish connections across dies allows the system to aggregate inter-die signals between kernels onto fewer inter-die wires 526. For example, interconnect circuitry 620-626 may be implemented as AXI interconnects that support memory mapped and/or streamed data transfers. Die 504 may include more than one kernel that communicates with a global resource in a different die. Using interconnect circuitry 620 and 622, for example, allows signals for both kernels in die 504 to be sent over the same set of inter-die wires, thereby reducing the number of physical resources needed for inter-die communication between kernels and global resources.

Using interconnect circuitry and including pipelining as illustrated in FIG. 6 also helps to improve timing of the dynamic region and the quality of result. The pipelining, for example, isolates the timing of signals crossing from one die to another thereby improving the likelihood that the dynamic design will meeting timing. The inserted interconnect circuitry further allows the programmable circuitry on different dies to be treated as a single, larger region, whether a static region or a dynamic region.

The interconnect architecture illustrated in FIG. 6 is provided for purposes of illustration and not limitation. It should be appreciated that global resources may be included in one or more or all dies. One or more kernels may be included in one or more or all dies. In some cases, a die may not include any kernels. In any case, a given global resource may be shared among two or more kernels. Further, a single kernel may map onto more than one global resource.

Figure 7:
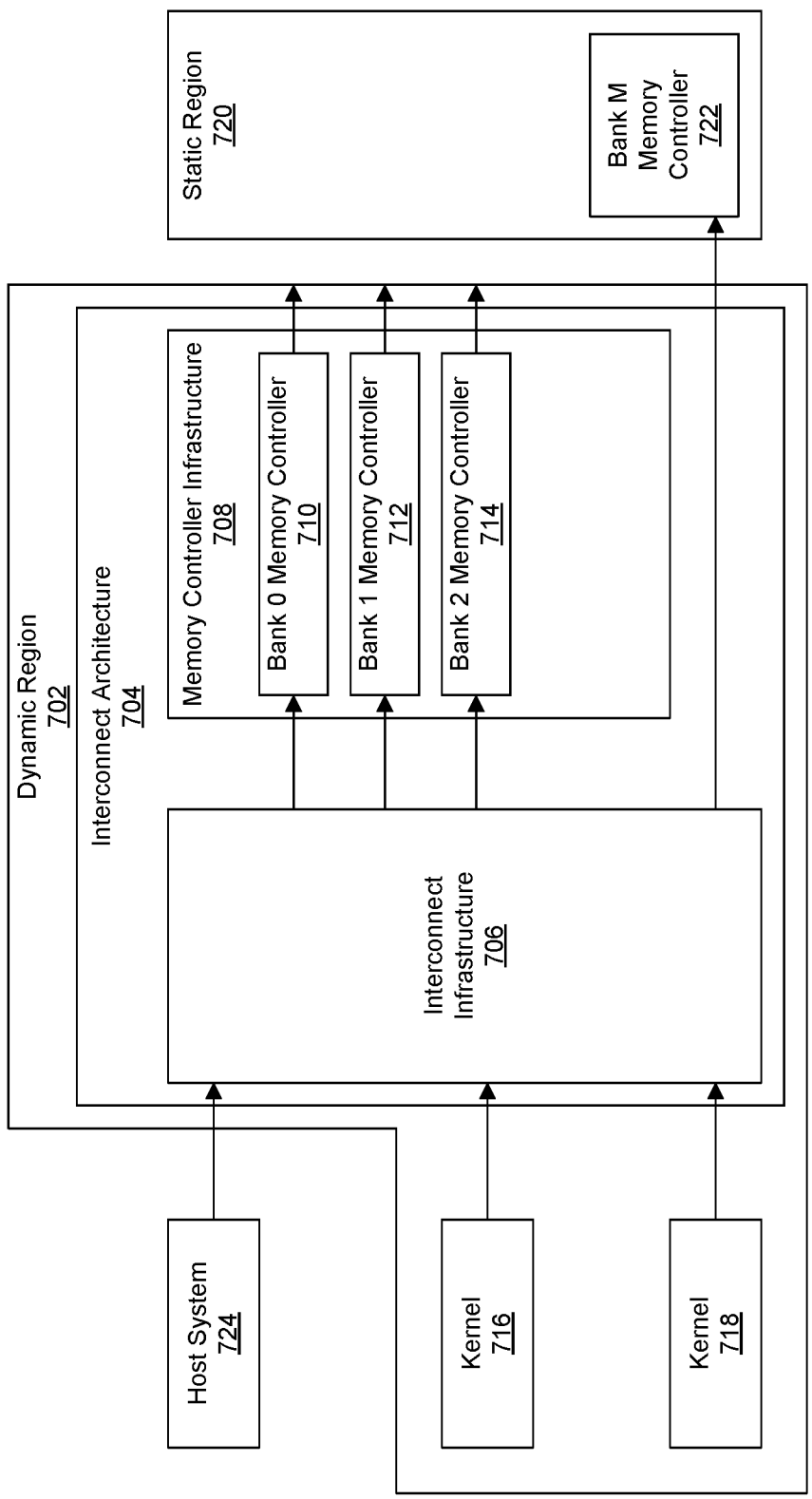
FIG. 7 illustrates another example of a static region and an adaptive dynamic region within an IC.

FIG. 7 illustrates another example of a static region and an adaptive dynamic region within an IC. The IC may have an architecture the same as or similar to the architecture described in connection with FIG. 1 and may include one or more dies. In the example of FIG. 7, dynamic region 702 includes an interconnect architecture 704. Interconnect architecture 704 may be customized based on the user specified kernel(s) that are provided for implementation within dynamic region 702, the connectivity of the user specified kernel(s), the accelerator platform, and/or any user specified implementation directives.

Interconnect architecture 704 includes an interconnect infrastructure 706 and a memory controller infrastructure 708. Interconnect infrastructure 706 may be implemented to connect to each user specified kernel, e.g., kernels 716 and 718, and to the host system, e.g., host system 724. Interconnect infrastructure 706 provides connectivity to static region 720 and optionally to a memory controller 722 that may be implemented therein. Interconnect infrastructure 706 further provides connectivity between kernels 716 and 718 and host memory system 724 to memory controller infrastructure 708.

In the example of FIG. 7, since kernels 716 and 718 are mapped only to banks 0, 1, and 2 of the accelerator platform, for example, only memory controllers 710, 712, and 714 are instantiated for those memory banks. Additional memory controllers for other available memory banks on the acceleration platform are not instantiated. In the example of FIG. 7, interconnect infrastructure 706 is implemented using interconnect circuitry.

In the example of FIG. 7, kernels 716 and 718 and host system 724 are connected to interconnect infrastructure 706 via AXI interconnects. While the master for host system 724 may reside in the static region, the master will have a connection to interconnect circuitry 906 in dynamic region 902. As shown, interconnect infrastructure 706 couples to memory controllers 710, 712, and 714 via AXI interconnects. Memory controllers 710, 712, and 714 further provide memory control signals suitable for accessing and/or controlling a RAM such as a Double Data Rate (DDR) type of RAM or other suitable memory.

In one example, each kernel is coupled to interconnect infrastructure 706 via a memory mapped interface and a control interface. The memory mapped interface may be an AXI memory mapped interface. The control interface may be an AXI-Lite interface. Circuitry supporting memory mapped interfaces, control interfaces, reset signals, and clock signals provided to dynamic region 702 are routed through static region 720. In the case of a multi-die IC, the memory mapped interfaces, control interfaces, reset signals, and clock signals provided to dynamic region 702 are routed through the static region in each of the dies. By including such resources in the static region in each respective die, the networks in each respective die corresponding to dynamic region 702 are isolated. Further, inter-die signals from one die to another are minimized.

As noted, in the example of FIG. 7, interconnect infrastructure 706 is implemented to provide kernels 716 and/or 718 and/or host system 724 with access to memory controller 722 located in static region 720. Memory controller 722 is an example of a global resource that is located in static region 720 that may be accessed by kernel(s) located in dynamic region 702. In the example of FIG. 7, interconnect infrastructure 706 provides "passthrough" connectivity to kernels 716 and 718 and/or to host system 724 thereby allowing such circuits to access and/or control the global resource in static region 720. Kernels 716 and/or 718, for example, may access and use memory controller 722 in the same or similar manner as kernels 716 and/or 718 access any of memory controllers 710-714.

Figure 8:
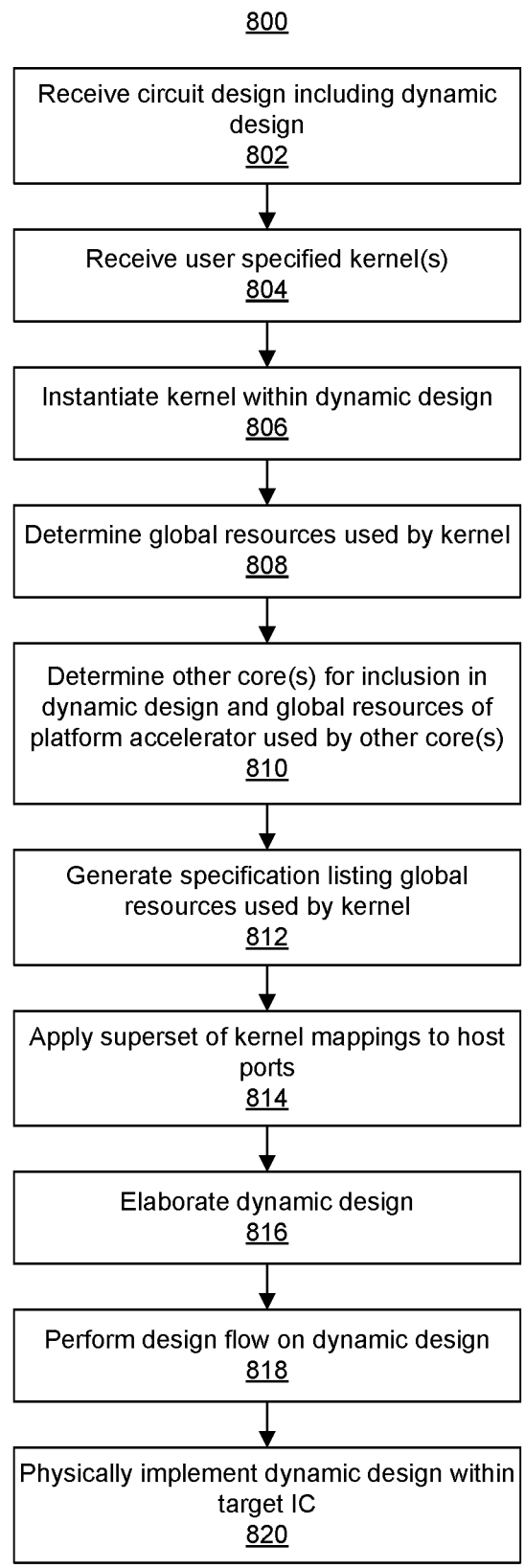
FIG. 8 illustrates an example method of creating an adaptive dynamic region within an IC.

FIG. 8 illustrates an example method 800 of creating an adaptive dynamic region within an IC. Method 800 may be performed by a computer (e.g., referred to herein in the context of FIG. 8 as a system) as described in connection with FIG. 2. Method 800 may begin in a state where a circuit design having a static design and a dynamic design is created. The circuit design may include one or more cores and one or more constraint files.

In one example, the circuit design may be specified as a hierarchical Intellectual Property (IP) or core. As an example, the circuit design may be stored as a device support archive (DSA) file. The DSA file may capture the static design and the dynamic design. The static design may be specified as a netlist. The netlist of the static design, for example, may be placed and routed. The dynamic design may be specified as a block diagram. The dynamic design, at least initially, may include an interconnect subsystem core.

The DSA file may also include platform metadata, emulation data, one or more configuration bitstreams, and the like. The platform metadata specifies information such as the particular global resources available on the accelerator platform (e.g., the board). For example, the metadata may specify the type, brand, and/or model of platform accelerator and available global resources on the accelerator platform, on the target IC, and/or remotely located from the accelerator platform. In another example, the metadata may also specify the particular type of IC (e.g., programmable IC) that is used on the accelerator platform for hardware acceleration and topology information for the IC such as the number of dies in the IC, the resources (e.g., global resources) available in the static region, and the like.

In block 802, the system is capable of receiving the circuit design. The circuit design includes a dynamic design. As discussed, the circuit design may include the static design. In other examples, the static design may be provided separately from the circuit design. In block 804, the system receives a kernel that is to be implemented. For example, a user, working with the system, provides one or more user inputs specifying a particular circuit design in the form of a DSA file. The user further provides one or more user inputs specifying one or more kernels that are to be implemented in the dynamic design portion of the DSA file. The system is capable of operating on the circuit design in combination with the kernel and any user provided directives. It should be appreciated that while method 800 is described in the context of receiving one kernel, that more than one kernel may be specified and included in the dynamic region.

In block 806, the system is capable of instantiating the kernel. For example, the system is capable of including the kernel within the dynamic design. In one aspect, in block 806, the system connects the kernel to a clock and to a reset. For example, the system is capable of connecting the kernel to a clock signal and a reset signal. The clock signal and the reset signal may come from the static region. In another aspect, the clock signal may come from the static region while the reset signal comes from a combination of circuitry in the static region and in the dynamic region. The clock and reset signals for the kernel may be separate and independent of the interconnect architecture implemented by the interconnect subsystem core.

In block 808, the system is capable of determining global resources that are used, and thus, required, by the kernel. In one example, the system determines the global resources used by the kernel by inspecting the kernel to detect the particular address regions corresponding to global resources to which the kernel is mapped.

In block 810, the system is capable of determining whether the user has included or specified any other cores (e.g., IPs) for inclusion in the dynamic design. Examples of other cores that the user may include in the dynamic design may include, but are not limited to, debug cores, logic analysis cores, profiling cores, and the like. The system is capable of determining what, if any, global resources are needed or used by these additional cores. In some examples, the user indicates that such cores are to be included in the dynamic design by using particular compilation options or switches. For example, the user may provide an instruction to implement the dynamic design (with a user specified kernel or kernels) and provide a compilation option or switch that requires debugging, signal monitoring, or the like for particular points or kernels in the dynamic design.

In block 812, the system is capable of generating a specification listing the global resources used by the kernel and/or any other cores included in the dynamic design. In one aspect, the specification may be a data structure listing address mappings of the kernel's address spaces to the address ranges of the global resources the kernel requires. The specification, for example, is a mapping of the global resource to the kernel. The specification may be stored in memory and may be updated and/or queried.

In block 814, the system is capable of applying a superset of the kernel mappings, e.g., per the specification, to one or more host ports of the interconnect architecture. The system is capable of generating a host mapping by applying the mapping of the global resource to the kernel (e.g., per the specification) to ports of the interconnect architecture corresponding to the host system. The host mapping may be implemented as a superset of the mapping of the global resource to the kernel.

For example, the system may treat the host system connections to the interconnect architecture differently than kernel connections. In general, the host connection does not affect the instantiation of global resources. Only the mappings of the kernel(s) to the global resources are used to determine the set of instantiated global resources. In block 814, after the system has determined each set of kernel mappings, the system is capable of applying a superset copy of the kernel mappings to the host interface. By applying a superset copy of the kernel mappings, the host interface is able to see all of the same global resources mapped for use by the kernels.

For example, consider the case where the kernel is one of a plurality of kernels included in the dynamic design. In that case, the host mapping may be implemented as a superset of the mapping of the global resource or global resources to the plurality of kernels. A superset of the mapping refers to the case where the mappings of more than one kernel may be applied to the host system. In illustration, a first kernel may map to global resources A and B, while a second kernel maps to global resources A and C. The host superset mapping maps the host system to global resources A, B, and C.

In block 816, the system is capable of elaborating the dynamic design. For example, the system is capable of elaborating the interconnect subsystem core to implement the interconnect architecture for the dynamic region. The system is capable of creating the interconnect infrastructure. The system is also capable of instantiating any memory controller instances or other related internal circuitry of the dynamic design necessary to satisfy the kernel resource mappings of the specification.

As an illustrative example, the system creates an instance for each circuit structure needed to implement the interconnect architecture of the dynamic region based on the kernel resource mapping. Each of the instances created in the dynamic region further may be configured with the necessary parameters such as address ranges and connections to implement the interconnect architecture. The system, for example, may utilize any of the metadata described herein with the kernel resource mapping (e.g., the specification) to instantiate the necessary circuitry and configure the circuitry that is instantiated with the correct parameters.

The system may also utilize previously determined information corresponding to the instantiated kernels to implement the interconnect architecture. For example, the system is capable of connecting the interconnect architecture to the same clock to which the kernel was connected in block 806 to facilitate synchronous communication. The system may also insert, or create, interconnect circuitry and pipelining as described herein in the case where kernels are distributed across one or more dies of the target IC.

With elaboration complete, the interconnect architecture includes the instances of circuit blocks needed by the kernel and implements the necessary connectivity (e.g., connections) between the kernel and any global resources used by the kernel. For example, the interconnect circuitry of the dynamic region is implemented to include one or more data interfaces (e.g., a memory mapped interface or a streamed interface) and a control interface (e.g., an AXI-Lite interface) for each kernel included in the dynamic design and for the host system. More particularly, the system is capable of modifying the interconnect circuitry of the dynamic region to include one or more data interfaces and one control interface for each kernel and one or more data interfaces and one or more control interfaces for the host system. The system further includes a memory controller for each memory bank mapped to a kernel included in the dynamic design. The system connects each memory bank to the interconnect circuitry and configures the interconnect circuitry to establish connections between each kernel and the particular memory controller implemented for the memory bank to which the kernel is mapped.

In another example, the interconnect subsystem core may be implemented as, or to include, program code that may be executed (or interpreted). The interconnect subsystem core may include an Application Programming Interface (API) that encapsulates the sequence of steps described as being performed by the system. In this regard, the interconnect subsystem core may provide the program code, as opposed to the EDA application itself, that elaborates the dynamic region.

In block 818, the system is capable of performing a design flow on the dynamic design. The system is capable of performing operations such as synthesis, placement, and routing on the dynamic design. The system is capable of generating a configuration bitstream, e.g., a partial configuration bitstream, for the dynamic region that implements the dynamic design. In an illustrative example, the system is capable of synthesizing the dynamic design and linking the dynamic design to the static design (e.g., linking the respective netlists where the static design may have been previously placed and routed). The system is capable of completing the design flow to implement the dynamic design.

In another example, the system may generate a configuration bitstream, e.g., a partial configuration bitstream, for the static design. In still another example, the system may generate a configuration bitstream that specifies both the static region and the dynamic region. In any case, the dynamic region only includes the infrastructure circuitry that is needed by the user specified kernel(s) and implementation options.

In block 820, the system is capable of physically implementing the dynamic design within the target IC. In most cases, the target IC is already powered on and has a functional static region operating therein. The system, as part of a hardware acceleration system, is capable of loading the partial configuration bitstream corresponding to the dynamic design including the user specified kernel(s) into the target IC of the accelerator platform. Loading the partial configuration bitstream for the dynamic design physically implements the dynamic design in the dynamic region of the target IC.

Figure 9:
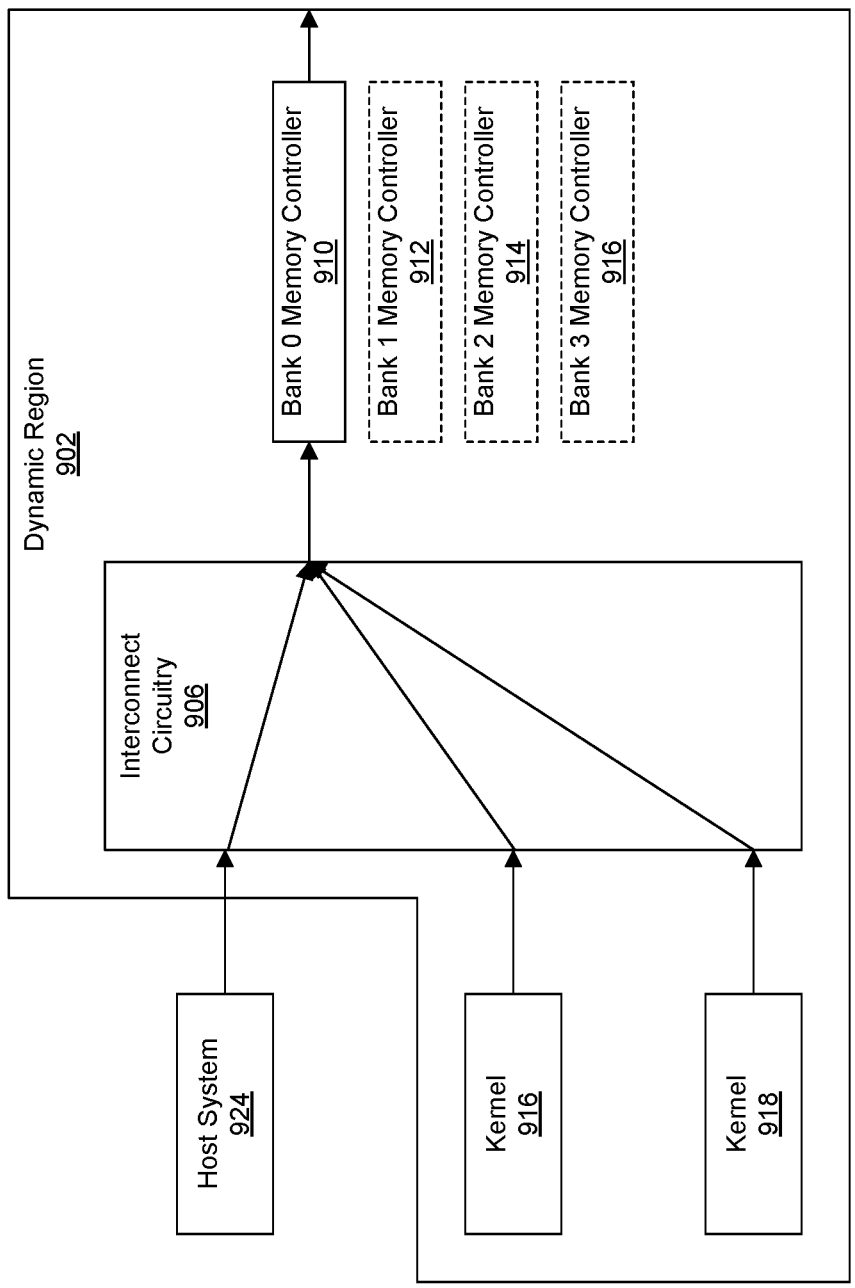
FIG. 9 illustrates another example of an adaptive dynamic region within an IC.

FIG. 9 illustrates another example of an adaptive dynamic region 902 within an IC. Dynamic region 902 may be implemented using a process as described in connection with FIG. 8. Further, dynamic region 902 may span one or more dies of an IC. In the example of FIG. 9, the user has specified two kernels 916 and 918. In this example, the interconnect subsystem core is parameterized to generate interconnect circuitry 906 and to include a memory controller 910. Interconnect circuitry 906 provides a data connection (e.g., a memory mapped connection or a streamed connection) and a control interface to each of kernels 916 and 918 and to host system 924. Interconnect circuitry 906 is connected to memory controller 910 for bank 0. For example, the system determines that kernels 916 and 918 are only mapped to memory bank 0. As such, the system instantiates only memory controller 910.

In the example of FIG. 9, the accelerator platform supports up to four memory controllers. Memory controllers 912, 914, and 916 corresponding to memory banks 1, 2, and 3 are shown in dashed lines to indicate that the system has not instantiated memory controllers 912, 914, and 916. The system does not include global resources such as memory controllers 912-916 in dynamic region 902 that are not used by the user specified kernels included therein. Further, interconnect circuitry 906 includes only the ports and switch circuitry necessary to couple the user specified kernels to the memory controller that is actually implemented (e.g., memory controller 910). Interconnect circuitry 906, for example, does not include additional input ports for additional kernels and/or output ports to couple to unused and un-instantiated (unimplemented) memory controllers.

In the examples described herein, the details of the dynamic region architecture are more fully abstracted from the user (e.g., kernel developer). Unlike prior approaches, the user would be required to know accelerator platform specific details relating to accelerator platform and/or programmable IC topology. The resource-name abstractions implemented for the interconnect subsystem core provide isolation of the implementation details of the infrastructure of the dynamic region from the user. This abstraction further increases portability of the user application (e.g., the dynamic design) between different acceleration platforms.

The system, in implementing the interconnect circuitry of the dynamic region, is capable of reading the metadata of the circuit design (e.g., in the DSA file) for the acceleration platform. As discussed, the metadata may include information relating to the target IC including the topology of the target IC specifying the number of dies included therein and available inter-die wires. The system is capable of including and/or modifying the interconnect circuitry implemented in the dynamic region to optimize timing. For example, the system is capable of inserting interconnect circuitry that straddles dies thereby coupling different sub-portions of the dynamic region across dies. The system may insert pipelining in the interconnect circuitry to improve timing of inter-die signals.

The system may also optimize the number of inter-die wires actually used by the dynamic region. The system is capable of altering the topology of the dynamic region to aggregate inter-die signals. By aggregating inter-die signals to conserve inter-die wires on the target IC, other resources (e.g., circuitry) of the target IC will remain available for use by other kernels that the user may wish to implement within the dynamic region. During implementation, e.g., the design flow, the system is capable of adding physical design constraints to explicitly floorplan where the pipeline stages will be located to straddle the die-to-die boundaries as illustrated in connection with FIG. 6.

Figure 10:
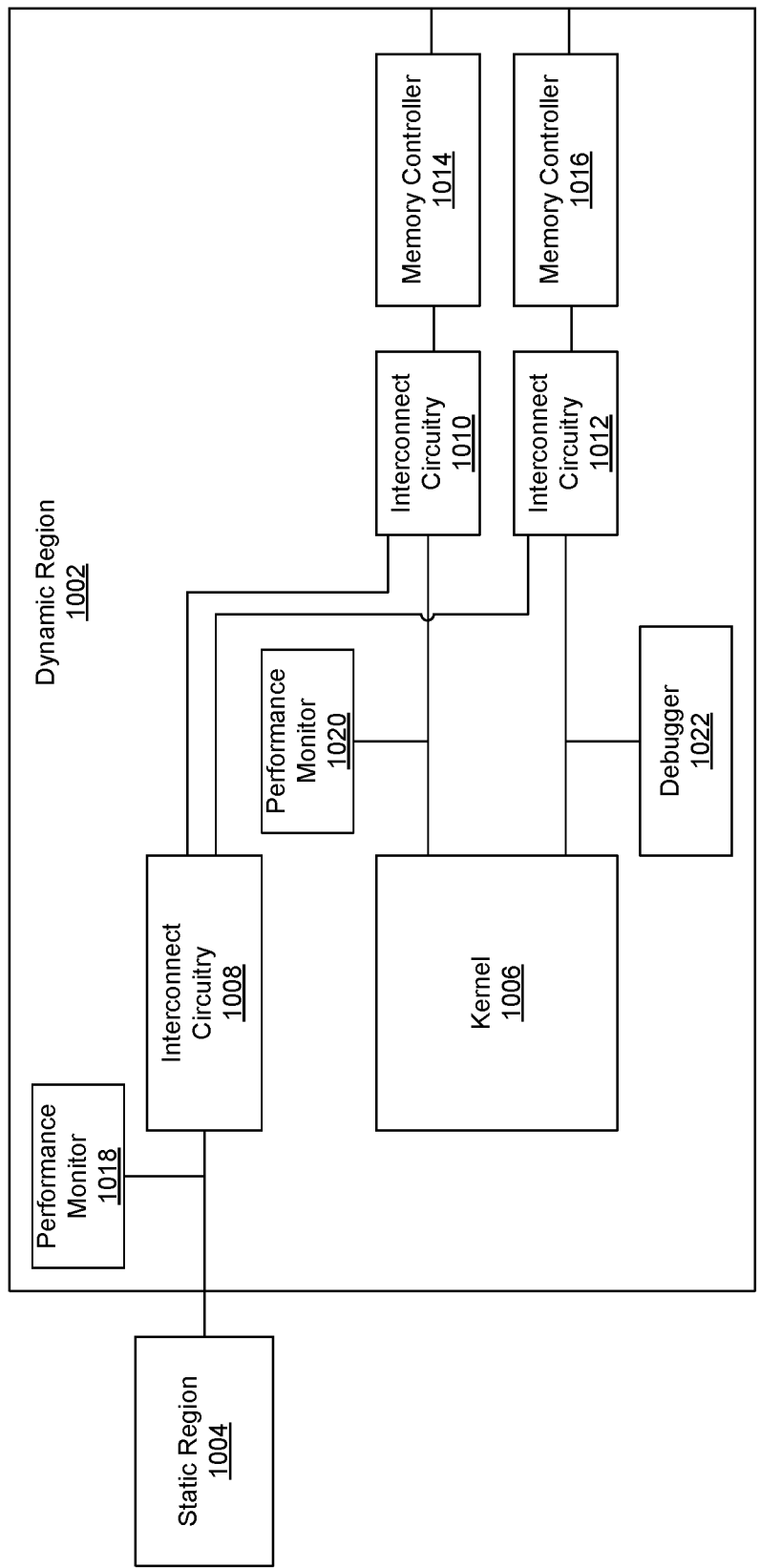
FIG. 10 illustrates another example of an adaptive dynamic region and a static region within an IC.

FIG. 10 illustrates another example of an adaptive dynamic region 1002 and a static region 1004 within an IC. The IC may have an architecture the same as or similar to the architecture described in connection with FIG. 1. Further, dynamic region 1002 may span multiple dies. In the example of FIG. 10, dynamic region 1002 includes a kernel 1006. Kernel 1006 is implemented using a process as described in connection with FIG. 8. In the example of FIG. 10, kernel 1006 is mapped to address spaces corresponding to two different memory banks. As such, the system has instantiated interconnect circuitry 1008, interconnect circuitry 1010 and memory controller 1014, and interconnect circuitry 1012 and memory controller 1016. Kernel 1006 is coupled to interconnect circuitry 1010 and 1012 to access memory controllers 1014 and 1016.

In the example of FIG. 10, the user has requested inclusion of additional cores such as performance monitor 1018, performance monitor 1020, and debugger 1022. As discussed, the user may request inclusion of such circuitry as compilation options when using the system. In implementing dynamic region 1002, the system determines the connectivity of the performance monitor cores and the debugger cores. The system is capable of modifying the interconnect architecture core to include the necessary ports and connections for each respective core that is added.

FIG. 11 illustrates an example method 1100 of creating an adaptive dynamic region within an IC. Method 1100 may be implemented using a computer system described within this disclosure in connection with FIG. 1.

In block 1102, the system is capable of receiving a kernel for inclusion in a circuit design for an IC of an accelerator platform. The circuit design may include a static design corresponding to a static region of programmable circuitry of the integrated circuit and a dynamic design corresponding to a dynamic region of the programmable circuitry. As discussed, in another example, the circuit design may include a dynamic design (e.g., only a dynamic design). In block 1104, the system includes the kernel within the dynamic design.

In block 1106, the system determines a global resource used by the kernel. The global resource may be volatile memory of the accelerator platform, non-volatile memory of the accelerator platform, an interface of the accelerator platform, a peripheral of the accelerator platform (e.g., a processor), a remote resource, or the like. In another example, the system is further capable of determining other cores included in dynamic design. The system may detect cores that implement debugging circuitry, monitor cores (e.g., logic analyzer cores and/or probes), and the like.

In block 1108, the system constructs an interconnect architecture for the dynamic design based on the global resource used by the kernel. As discussed, the system is capable of elaborating the dynamic design. The system is capable of constructing the interconnect architecture based on the particular cores that are included in the dynamic design. The system includes the number of ports required (e.g., data and/or control) in the interconnect circuitry based on the number of kernels included and/or other cores included and the need to communicate with the host system.

The system further includes the memory controllers required by the kernels. For example, the system is capable of creating a memory controller in the dynamic design for the kernel in response to determining that the global resource is mapped to an address space of the kernel. As illustrated, the system further is capable of configuring the interconnect architecture to provide the kernel with passthrough connectivity to a global resource located in the static region. The system, in constructing the interconnect circuitry, only includes global resources and connectivity used by the kernel as part of the interconnect architecture.

In block 1110, the system is capable of implementing the dynamic design. For example, the system is capable of synthesizing, placing, and routing the dynamic design. The system is further capable of generating a configuration bitstream (e.g., a partial configuration bitstream) for the dynamic design and loading the configuration bitstream into the target IC on the accelerator platform thereby physically implementing the circuitry specified by the dynamic design in the dynamic region of the target IC of the accelerator platform.

By creating the dynamic region within the target IC of an accelerator platform as described, the dynamic region is customized based on the specific requirements of the particular kernels the user wishes to implement and the implementation options selected by the user. The system detects which global resources of the accelerator platform are required and which are not and constructs the dynamic region accordingly. As such, the examples described within this disclosure allow the system to perform a design flow to create the dynamic region in less time (e.g., faster runtime) than using other techniques due, at least in part, to only having to synthesize, place, and route circuitry that is actually utilized by the kernel(s). Further, the system is able to perform the design flow faster due to less contention for fixed resources of the target IC.

Further, the resulting dynamic region may provide a higher compute density than is otherwise the case since unused infrastructure circuitry is omitted thereby allowing larger and/or more kernels to be implemented therein. The resulting dynamic region consumes less power than would otherwise be the case since unused infrastructure circuitry is omitted and does not consume power. The system is capable of generating the dynamic region with an increased likelihood of meeting timing constraints since unused infrastructure circuitry is omitted and need not be synthesized, placed, or routed (e.g., such infrastructure circuitry does not compete with used circuitry for programmable circuitry resources).

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method can include receiving, using computer hardware, a first kernel for inclusion in a circuit design for an IC of an accelerator platform. The circuit design includes a dynamic design corresponding to a dynamic region of programmable circuitry in the IC that couples to a static region of the programmable circuitry. The method includes including, using the computer hardware, the first kernel within the dynamic design, determining, using the computer hardware, a global resource of the accelerator platform used by the first kernel, and constructing, using the computer hardware, an interconnect architecture for the dynamic design based on the global resource used by the first kernel.

In another aspect, constructing the interconnect architecture for the dynamic design can include creating a memory controller in the dynamic design for the first kernel in response to determining that the global resource is mapped to an address space of the first kernel.

In another aspect, constructing the interconnect architecture for the dynamic design can include only including global resources used by the first kernel as part of the interconnect architecture.

In another aspect, the global resource is located in the static region.

In another aspect, the constructing can include determining a mapping of the global resource to the first kernel and generating a host mapping by applying the mapping of the global resource to the first kernel to ports of the interconnect architecture corresponding to a host system. In the case where the first kernel is one of a plurality of kernels included in the dynamic design and the global resource is one of a plurality of global resources with mappings to the plurality of kernels, the host mapping may be implemented as a superset of the mappings of the plurality of global resources to the plurality of kernels.

In another aspect, the IC includes a plurality of dies each having programmable circuitry. The method can include determining a user specified constraint indicating a selected die of the plurality of dies to locate the first kernel and locating the first kernel in the selected die of the plurality of dies.

In another aspect, the IC includes a plurality of dies each implementing a portion of the dynamic region. The portion of the dynamic region of a first die of the plurality of dies includes the first kernel; and, the portion of the dynamic region of the second die of the plurality of dies includes a second kernel. In that case, the method may include inserting interconnect circuitry into the first die and the second die coupling the first kernel and the second kernel to the global resource.

In another aspect, the method can include inserting pipelining circuitry within the interconnect circuitry.

In another aspect, the method can include inserting pipelining circuitry within at least one of the first interconnect circuitry or the second interconnect circuitry.

In another aspect, the method can include determining a user-specified core to be included in the dynamic design and constructing the interconnect architecture for the dynamic design to include the user-specified core.

A system can include a processor configured to initiate operations. The operations include receiving a first kernel for inclusion in a circuit design for an IC of an accelerator platform. The circuit design includes a dynamic design corresponding to a dynamic region of programmable circuitry in the IC that couples to a static region of the programmable circuitry. The operations include including the first kernel within the dynamic design, determining a global resource of the accelerator platform used by the first kernel, and constructing an interconnect architecture for the dynamic design based on the global resource used by the first kernel.

In another aspect, constructing the interconnect architecture for the dynamic design can include creating a memory controller in the dynamic design for the first kernel in response to determining that the global resource is mapped to an address space of the first kernel.

In another aspect, constructing the interconnect architecture for the dynamic design can include only including global resources used by the first kernel as part of the interconnect architecture.

In another aspect, the global resource is located in the static region.

In another aspect, the constructing can include determining a mapping of the global resource to the first kernel and generating a host mapping by applying the mapping of the global resource to the first kernel to ports of the interconnect architecture corresponding to a host system. In the case where the first kernel is one of a plurality of kernels included in the dynamic design and the global resource is one of a plurality of global resources with mappings to the plurality of kernels, the host mapping may be implemented as a superset of the mappings of the plurality of global resources to the plurality of kernels.

In another aspect, the IC includes a plurality of dies each having programmable circuitry. The operations can include determining a user specified constraint indicating a selected die of the plurality of dies to locate the first kernel and locating the first kernel in the selected die of the plurality of dies.

In another aspect, the IC includes a plurality of dies each implementing a portion of the dynamic region. The portion of the dynamic region of a first die of the plurality of dies includes the first kernel; and, the portion of the dynamic region of the second die of the plurality of dies includes a second kernel. In that case, the method may include inserting interconnect circuitry into the first die and the second die coupling the first kernel and the second kernel to the global resource.

In another aspect, the operations can include inserting pipelining circuitry within the interconnect circuitry.

In another aspect, the operations can include determining a user-specified core to be included in the dynamic design and constructing the interconnect architecture for the dynamic design to include the user-specified core.

A computer program product can include a computer readable storage medium having program code stored thereon. The program code is executable by a processor to perform operations. The operations include receiving a first kernel for inclusion in a circuit design for an IC of an accelerator platform. The circuit design includes a dynamic design corresponding to a dynamic region of programmable circuitry in the IC that couples to a static region of the programmable circuitry. The operations include including the first kernel within the dynamic design, determining a global resource of the accelerator platform used by the first kernel, and constructing an interconnect architecture for the dynamic design based on the global resource used by the first kernel.

In another aspect, constructing the interconnect architecture for the dynamic design can include creating a memory controller in the dynamic design for the first kernel in response to determining that the global resource is mapped to an address space of the first kernel.

In another aspect, constructing the interconnect architecture for the dynamic design can include only including global resources used by the first kernel as part of the interconnect architecture.

In another aspect, the global resource is located in the static region.

In another aspect, the constructing can include determining a mapping of the global resource to the first kernel and generating a host mapping by applying the mapping of the global resource to the first kernel to ports of the interconnect architecture corresponding to a host system. In the case where the first kernel is one of a plurality of kernels included in the dynamic design and the global resource is one of a plurality of global resources with mappings to the plurality of kernels, the host mapping may be implemented as a superset of the mappings of the plurality of global resources to the plurality of kernels.

In another aspect, the IC includes a plurality of dies each having programmable circuitry. The operations can include determining a user specified constraint indicating a selected die of the plurality of dies to locate the first kernel and locating the first kernel in the selected die of the plurality of dies.

In another aspect, the IC includes a plurality of dies each implementing a portion of the dynamic region. The portion of the dynamic region of a first die of the plurality of dies includes the first kernel; and, the portion of the dynamic region of the second die of the plurality of dies includes a second kernel. In that case, the method may include inserting interconnect circuitry into the first die and the second die coupling the first kernel and the second kernel to the global resource.

In another aspect, the operations can include inserting pipelining circuitry within the interconnect circuitry.

In another aspect, the operations can include determining a user-specified core to be included in the dynamic design and constructing the interconnect architecture for the dynamic design to include the user-specified core.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   receiving, using computer hardware, a first kernel for inclusion in a circuit design for an integrated circuit of an accelerator platform, wherein the circuit design includes a dynamic design corresponding to a dynamic region of programmable circuitry in the integrated circuit that couples to a static region of the programmable circuitry;
   including, using the computer hardware, the first kernel within the dynamic design;
   determining, using the computer hardware, a global resource of the accelerator platform used by the first kernel, wherein the global resource is external to the integrated circuit; and
   constructing, using the computer hardware, an interconnect architecture for the dynamic design based on the global resource used by the first kernel.

2. The method of claim 1, wherein the constructing the interconnect architecture for the dynamic design comprises:
   creating a memory controller in the dynamic design for the first kernel in response to determining that the global resource is mapped to an address space of the first kernel.

3. The method of claim 1, wherein the constructing the interconnect architecture for the dynamic design comprises:
   only including global resources used by the first kernel as part of the interconnect architecture.

4. The method of claim 1, wherein a controller for the global resource is located in the static region.

5. The method of claim 1, wherein the constructing comprises:
   determining a mapping of the global resource to the first kernel; and
   generating a host mapping by applying the mapping of the global resource to the first kernel to ports of the interconnect architecture corresponding to a host system.

6. The method of claim 5, wherein the first kernel is one of a plurality of kernels included in the dynamic design and the global resource is one of a plurality of global resources with mappings to the plurality of kernels, wherein the host mapping is a superset of the mappings of the plurality of global resources to the plurality of kernels.

7. The method of claim 1, wherein the integrated circuit includes a plurality of dies each having programmable circuitry, the method further comprising:
   determining a user specified constraint indicating a selected die of the plurality of dies to locate the first kernel; and
   locating the first kernel in the selected die of the plurality of dies.

8. The method of claim 1, wherein the integrated circuit includes a plurality of dies each implementing a portion of the dynamic region, wherein the portion of the dynamic region of a first die of the plurality of dies includes the first kernel and the portion of the dynamic region of a second die of the plurality of dies includes a second kernel, the method further comprising:
   inserting interconnect circuitry into the first die and the second die coupling the first kernel and the second kernel to the global resource.

9. The method of claim 8, further comprising:
   inserting pipelining circuitry within the interconnect circuitry.

10. The method of claim 1, further comprising:
    determining a user-specified core to be included in the dynamic design; and
    constructing the interconnect architecture for the dynamic design to include the user-specified core.

11. A system, comprising:
    a processor configured to initiate operations including:
    receiving a first kernel for inclusion in a circuit design for an integrated circuit of an accelerator platform, wherein the circuit design includes a dynamic design corresponding to a dynamic region of programmable circuitry in the integrated circuit that couples to a static region of the programmable circuitry;
    including the first kernel within the dynamic design;
    determining a global resource of the accelerator platform used by the first kernel, wherein the global resource is external to the integrated circuit; and
    constructing an interconnect architecture for the dynamic design based on the global resource used by the first kernel.

12. The system of claim 11, wherein the constructing the interconnect architecture for the dynamic design comprises:
    creating a memory controller in the dynamic design for the first kernel in response to determining that the global resource is mapped to an address space of the first kernel.

13. The system of claim 11, wherein the constructing the interconnect architecture for the dynamic design comprises:
    only including global resources of the accelerator platform used by the first kernel as part of the interconnect architecture.

14. The system of claim 11, wherein a controller for the global resource is located in the static region.

15. The system of claim 11, wherein the constructing comprises:
    determining a mapping of the global resource to the first kernel; and
    generating a host mapping by applying the mapping of the global resource to the first kernel to ports of the interconnect architecture corresponding to a host system;
    wherein the host mapping is a superset of the mapping of the global resource to the first kernel.

16. The system of claim 11, wherein the integrated circuit includes a plurality of dies each having programmable circuitry, wherein the processor is configured to initiate operations further comprising:
    determining a user specified constraint indicating a selected die of the plurality of dies to locate the first kernel; and
    locating the first kernel in the selected die of the plurality of dies.

17. The system of claim 11, wherein the integrated circuit includes a plurality of dies each implementing a portion of the dynamic region, wherein the portion of the dynamic region of a first die of the plurality of dies includes the first kernel and the portion of the dynamic region of a second die of the plurality of dies includes a second kernel, wherein the processor is configured to initiate operations further comprising:
    inserting interconnect circuitry into the first die and the second die coupling the first kernel and the second kernel to the global resource.

18. The system of claim 17, wherein the processor is configured to initiate operations further comprising:
    inserting pipelining circuitry within the interconnect circuitry.

19. The system of claim 11, wherein the processor is configured to initiate operations further comprising:
    determining a user-specified core to be included in the dynamic design; and
    constructing the interconnect architecture for the dynamic design to include the user-specified core.

20. A computer program product, comprising:
    a computer readable storage medium having program code stored thereon, wherein the program code is executable by computer hardware to initiate operations including:
    receiving a first kernel for inclusion in a circuit design for an integrated circuit of an accelerator platform, wherein the circuit design includes a dynamic design corresponding to a dynamic region of programmable circuitry in the integrated circuit that couples to a static region of the programmable circuitry;
    including the first kernel within the dynamic design;
    determining a global resource of the accelerator platform used by the first kernel, wherein the global resource is external to the integrated circuit; and
    constructing an interconnect architecture for the dynamic design based on the global resource used by the first kernel.

* * * * *